US005922169A

United States Patent [19]

Chodacki et al.

[11] Patent Number: 5,922,169

[45] Date of Patent: *Jul. 13, 1999

[54] LINERLESS LABEL APPLYING SYSTEM

[75] Inventors: Richard Chodacki, Bartlett; Jose Pioquinto, Des Plaines; Gary VanderSyde, Naperville; David Haas, Schaumburg; K. George Rabindran, Morton Grove, all of Ill.

[73] Assignee: Bell & Howell Postal Systems Inc., Lincolnwood, Ill.

[ * ] Notice: This patent is subject to a terminal disclaimer.

[21] Appl. No.: 08/749,423

[22] Filed: Nov. 15, 1996

Related U.S. Application Data

[63] Continuation of application No. 08/508,069, Jul. 27, 1996, abandoned.

[51] Int. Cl.[6] .......... B32B 31/00

[52] U.S. Cl. .......... 156/521; 156/361; 156/355; 156/358; 156/351; 156/517; 156/556; 156/566; 83/636; 242/417

[58] Field of Search .......... 156/354, 355, 156/361, 351, 358

[56] References Cited

U.S. PATENT DOCUMENTS

| | | | |
|---|---|---|---|
| 2,493,737 | 1/1950 | Burns | 156/577 |
| 2,555,325 | 6/1951 | Doane | 156/521 |
| 3,035,695 | 5/1962 | Buchwald et al. | 209/82 |
| 3,261,464 | 7/1966 | Levy | 209/72 |
| 3,319,499 | 5/1967 | Hawkes et al. | 156/354 |
| 3,396,505 | 8/1968 | McCrudden | 53/61 |
| 3,472,724 | 10/1969 | Casey | 156/521 |
| 3,573,748 | 4/1971 | Holme | 340/172.5 |
| 3,729,362 | 4/1973 | French et al. | 156/542 |
| 3,751,324 | 8/1973 | Enskat | 156/521 |
| 3,769,139 | 10/1973 | Woods | 156/358 |
| 3,984,277 | 10/1976 | French et al. | 156/497 |
| 4,004,039 | 1/1977 | Shoaf et al. | 426/548 |
| 4,091,487 | 5/1978 | Axelrod | 11/1 AD |
| 4,250,690 | 2/1981 | Lorenzen et al. | 53/473 |
| 4,310,276 | 1/1982 | Castagnoli | 414/134 |
| 4,314,644 | 2/1982 | Stocker | 209/569 |
| 4,421,587 | 12/1983 | Guenther et al. | 156/521 |
| 4,547,252 | 10/1985 | LeMers | 156/497 |
| 4,581,094 | 4/1986 | Sato | 156/352 |
| 4,585,506 | 4/1986 | Matsuguchi | 156/361 |
| 4,612,079 | 9/1986 | Ostrow | 156/497 |
| 4,624,734 | 11/1986 | Voltmer et al. | 156/541 |
| 4,629,528 | 12/1986 | Tanaka et al. | 156/351 |
| 4,676,859 | 6/1987 | Cleary, Jr. et al. | 156/361 |
| 4,687,535 | 8/1987 | Voltmer | 156/361 |
| 4,701,239 | 10/1987 | Craig | 156/521 |
| 4,707,211 | 11/1987 | Shibata | 156/354 |
| 4,787,953 | 11/1988 | Trouteaud et al. | 156/387 |
| 4,840,696 | 6/1989 | Krasuski et al. | 156/353 |
| 4,853,063 | 8/1989 | Basgil et al. | 156/238 |
| 4,985,096 | 1/1991 | Bekker-Madsen | 156/353 |
| 5,076,879 | 12/1991 | Svyatsky | 156/361 |
| 5,133,980 | 7/1992 | Ream et al. | 426/115 |
| 5,149,392 | 9/1992 | Plaessmann | 156/542 |
| 5,188,696 | 2/1993 | Good, Jr. | 156/361 |
| 5,232,540 | 8/1993 | Southwell et al. | 156/361 |
| 5,254,206 | 10/1993 | Wing | 156/542 |
| 5,294,282 | 3/1994 | Rock et al. | 83/451 |
| 5,413,651 | 5/1995 | Otruba | 156/64 |
| 5,431,763 | 7/1995 | Bradshaw | 156/256 |
| 5,607,526 | 3/1997 | Buckley | 156/64 |
| 5,783,032 | 7/1998 | O'Callaghan et al. | 156/556 |

*Primary Examiner*—David A. Simmons
*Assistant Examiner*—Linda L. Gray
*Attorney, Agent, or Firm*—Sonnenschein Nath & Rosenthal

[57] ABSTRACT

A system for applying linerless labels to mailing items includes a label feeder for feeding a continuous length web of linerless label material from a supply roll through a loop path to a label applying station juxtaposed to the path traversed by mailing items conveyed on edge in sequential fashion by a belt conveyor. The label material passes through a web guide and advance assembly to a cutter station operative to sever the label material transversely and create labels of desired height. A paddle member is operative to engage and hold each successive label as it is being severed from the label material web generally simultaneously to adhere the adhesive side of the label against a mailing items passing through the label applying station. The various operating functions of the linerless label applying system may be coordinated by conventional control logic.

13 Claims, 8 Drawing Sheets

LINERLESS LABEL APPLYING SYSTEM

This application is a continuation of application Ser. No. 08/508,069, filed Jul. 7, 1996, now abandoned.

BACKGROUND OF THE INVENTION

The present invention relates generally to document handling systems, and more particularly to a novel system for forming labels from a continuous supply of linerless label material and applying the labels in sequential fashion to documents, such as mail pieces, as the documents are conveyed on edge along a predetermined path.

The volume of mail handled daily by large businesses, institutions and government entities, such as the Postal Service, credit card companies, utilities, mail order houses and other advertisers has steadily increased due in part to both an increase in population and a greater volume of business correspondence. Typically, the envelopes containing the material to be mailed are addressed and then sorted into common destination groups for mailing. Similarly, mail received by such entities is commonly sorted into groups based on identifiable subject matter on the received material. A third category of such envelopes is the returned mail category, the creation of which is primarily due to the addressee having moved from a particular address, or a smeared or non-readable bar code, resulting in the envelope being undeliverable. The present invention is directed to a system for solving the latter type problem, namely, the correction of the address and/or destination code on an envelope by application of a secondary label to the envelope, with a correct forwarding address or destination code either pre-printed on the label or applied to the label after it is affixed to the envelope to cover an invalid or non-readable address or bar code. Preferably, the label material inhibits the passage of light, whereby a bar code or address material beneath the label cannot be read by a bar code reader or an optical character reader.

Several different types of machines have been developed to assist in the handling of such mail, other than manual review and correction by an individual mail carrier. These prior art devices typically comprise an envelope feeder, a read station, a label selection station where a supply of labels permits selection of an appropriate label and its application to an envelope, and a sorting and storage device. See, for example, U.S. Pat. No. 5,076,879. While some of the prior art machines and systems have proven satisfactory, many are relatively large unwieldy machines that require not only a large amount of space but also require frequent replenishment of a vast array of pre-printed labels and maintenance of the applicating equipment. Also, labels furnished in a roll or fan where pre-cut labels are adhesively adhered to a substrate are expensive compared to the cost of linerless or substrate-free label material.

SUMMARY OF THE INVENTION

The present invention provides a novel compact system for applying linerless labels to documents such as mailing envelopes and the like and which may be used as a stand-alone label applicator or with conventional mail sorting machines to greatly increase the label applying rate in a highly efficient manner.

The system of the present invention includes a label feeder for providing a continuous length web of linerless label material having an adhesive surface and an opposite non-adhesive surface. The linerless label material is fed along a longitudinal path from a supply roll or fan folded source to a label applying station positioned in juxtaposed relation to the path traversed by documents in the form of mailing envelopes and the like as they are conveyed on edge in sequential fashion along a path transverse to the label material feeder path. The linerless label material web is advanced through a cutter station which is operative to sever the label material transversely and create a label of desired height in timed relation to passing of a document through the label applying station. The label applying station includes a paddle member supported at one end for pivotal movement in a generally horizontal plane normal to the upstanding documents as they are conveyed through the label applying station. The paddle member is operative to engage and hold each successive label by vacuum force as the label is being severed from the continuous length web of label material. Simultaneously, the paddle is pivoted so that its outer end presses a leading edge of the adhesive side of the label against the document passing through the label applying station. As the document and label move downstream, the paddle vacuum is automatically terminated, the label is released from the paddle, and the paddle member adheres the label against the document in a progressive fashion, after which the paddle member returns to its original position and the document is passed through a nip to firmly press the label onto the document.

The cutter station includes a cutter blade which progressively severs the label material transversely to create a label, and a stripper bar which moves with the cutter blade and returns the newly created leading edge of the label material to a position enabling advancement of the label material web preparatory to severing the next successive label. The label feeder includes sensors operative to sense the path through which the label material passes so as to maintain a feeder loop as the label material advances towards the cutter blade, and also to sense exhaustion of the supply of label material. Additional sensors responsive to the position of each document as they pass into the label application station initiate a timed control sequence to operate the various label advancing and applying elements. The various operating functions of the linerless label applying system may be coordinated by conventional control logic.

Accordingly, one of the primary objects of the present invention is to provide a novel system for applying linerless labels to mailing documents or the like as they are conveyed on edge in sequential fashion through a label applying station, and wherein the labels are formed from a continuous length web of rolled linerless label material. The present system may also be adapted to form labels from a continuous fan folded source of label material, or any other suitable continuous label material supply.

A more particular object of the present invention is to provide a novel system for applying linerless labels to mailing documents or the like as the documents are conveyed on edge through a label applying station, the linerless labels being formed from a continuous length web of linerless label material having a non-adhesive surface and an opposite adhesive surface and fed longitudinally from a roll or fan fold source to a label cutter and applying station operative to sever labels from the label material and apply the labels successively to documents being conveyed on edge through the label applying station.

A feature of the linerless label applying system in accordance with the present invention lies in the provision of a cutter blade which cooperates with the linerless label web material to progressively sever the label material transversely to create successive labels simultaneously with pivotal movement of a paddle member operative to hold and progressively adhere the adhesive surface of each label against a document being conveyed on edge past the label conveying station.

Another feature of the linerless label applying system in accordance with the present invention lies in providing a paddle member operative to initially hold each label formed by the cutter blade by vacuum and adhere the adhesive surface of the label against a document in a progressive fashion as the label advances with the document past the label applying station.

Another feature of the linerless label applying system in accordance with the present invention lies in the provision of a cutter blade assembly having a cutter blade movable in a plane normal to the linerless label material web and having a stripper bar fixed to the cutter blade in a generally parallel spaced relation so that the liner material web passes between the cutter blade and stripper bar, the cutter blade being movable to sever the label material web generally transversely thereof, and the stripper bar being operative to return the newly formed leading edge of the label material to a position enabling advancement of the label material web preparatory to cutting the next successive label therefrom.

Another feature of the linerless label applying system in accordance with the present invention lies in the provision of a label material web guide and advance manifold assembly having a planar generally vertically disposed guide surface to receive and guide the web to the cutter blade assembly, and a drive roller operative to advance the label material web in predetermined increments so as to vary the height of the labels as desired for imprinting a full address, a bar code or other indicia on the labels.

Still another feature of the present invention lies in the provision of a linerless label material feeder arrangement wherein a continuous length label material web is passed through a loop path and includes sensors operative to maintain a free loop of web material for rapid advance of the web through the cutter.

Further objects, advantages and features of the present invention will become apparent from the following detailed description of the invention taken in conjunction with the accompanying drawings wherein like reference numerals designate like elements throughout the several views.

DETAILED DESCRIPTION OF THE PREFERRED EMBODIMENT

Figure 1:
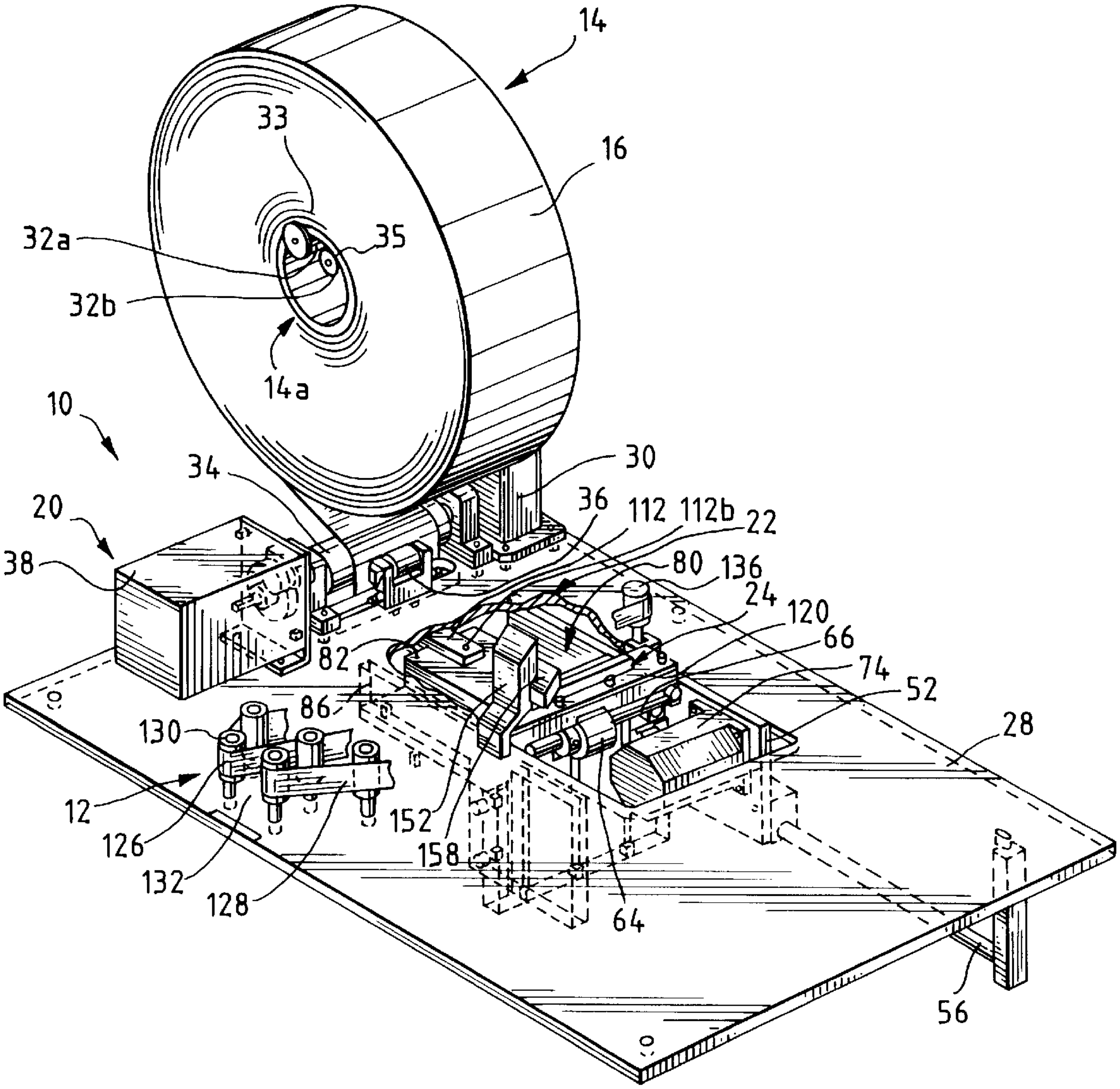
FIG. 1 is a fragmentary perspective view of a linerless label applying system constructed in accordance with a preferred embodiment of the present invention.

Referring now to the drawings, and in particular to FIGS. 1–4, a linerless label applying system constructed in accordance with the present invention is indicated generally at 10. As will be described more fully below, the linerless label application system 10 is operative to apply linerless labels to documents, such as mailing envelopes and the like, as the documents are conveyed on edge in a generally vertical orientation along a predetermined horizontally extending path established by a conveyor belt system, indicated generally at 12 in FIG. 2. The label applying system 10 finds particular application in conjunction with mail handling systems requiring a facility for applying a corrective address label or a bar code or the like to an envelope having an incorrect or defective address or bar code thereon which requires correction. The linerless label system 10 may be used as a stand-alone label applying system operative to create linerless labels of varying size and apply them to mailing envelopes and like documents manually fed into the system, or may be utilized with conventional mail sorting machines to create and apply labels to mailing envelopes conveyed on edge from an upstream processing station in which the improper or defective address or bar code is detected and from which the document is passed through the conveyor belt system 12 for applying a linerless label thereto.

Briefly, the linerless label applying system 10 includes a source or supply of continuous length linerless label material, such as in the form of a roll 14 of linerless label web material 16. The linerless label material 16 has an adhesive surface on one side, such as the inwardly facing surface of the wound web, and a non-adhesive outwardly facing surface on the opposite side adapted to have indicia printed thereon, such as an address or a bar code. The address or bar code may be printed on the non-adhesive side of a linerless label by a conventional printer (not shown) either prior to applying a label to a mailing document or after applying the label thereto. The label applying system 10 includes a label feeder means, indicated generally at 20, which is cooperative with the label material web 16 for effecting unwinding from the roll 14 and feeding the label material web longitudinally along a looped path to a cutter station, indicated generally at 22. The cutter station 22 is operative to sever the label material web generally transversely of its longitudinal axis to create labels of selectively variable height. A label applying means in the form of a paddle member 24 is supported adjacent the cutter station 22 and is operative to engage the non-adhesive surface of a cut label and hold the label by vacuum while moving the adhesive surface of the label into engagement with a mailing document being conveyed along the conveyor belt system 12 in juxtaposed relation to the paddle member. As will be described, the paddle member 24 is operative to initially lightly press the leading edge of a label against a document juxtaposed to the label applying paddle member and progressively adhere the remainder of the label against the document as the document and the label advance downstream from the paddle member.

Figure 2:
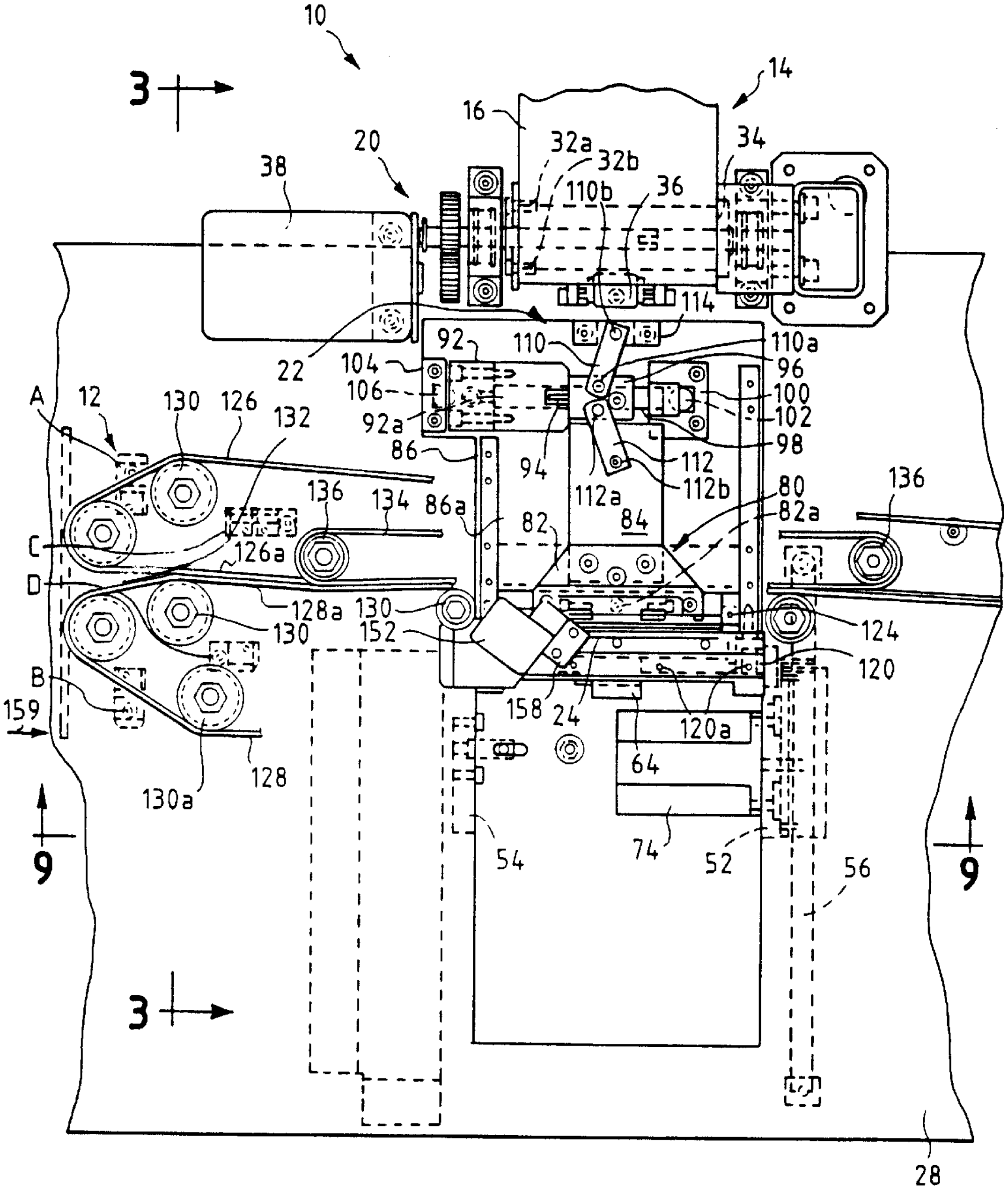
FIG. 2 is a plan view of the linerless label applying system illustrated in FIG. 1.

Turning now to a more detailed description of the linerless label applying system 10 shown particularly in FIGS. 1–2, the various components are supported on or suspended from a generally planar base or top plate 28. The base plate 28 is preferably supported at a convenient operator height. When used with other mail document handling apparatus, the base plate 28 is positioned so that the conveyor belt system 12 is aligned with an upstream conveyor belt system operative to convey mailing documents and the like in sequential order to the linerless label applying system 10. The base plate 28 supports the roll 14 of linerless label web material 16 through an upstanding support arm 30 (FIG. 1) which is fixed at its lower end to the plate 28. The support arm 30 supports a pair of parallel spaced horizontal support rollers 32*a* and 32*b* (FIGS. 1 and 2) which extend through an axial opening 14*a* (FIG. 1) of the roll 14 so as to support the roll and enable free rotation of the roll during unwinding of the linerless label web material 16. Enlarged diameter discs 33 and 35 on the outer ends of the rollers 32*a* and 32*b* FIG. 1 prevent inadvertent release of the roll 14 from the support rollers.

Figure 5:
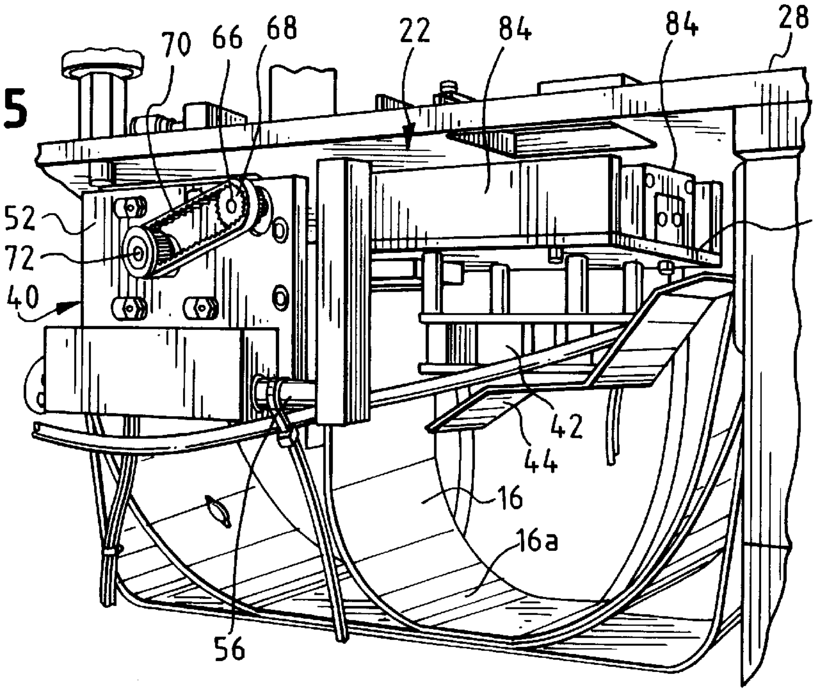
FIG. 5 is a fragmentary perspective view taken from the opposite side of the apparatus shown in FIG. 3.

As illustrated in FIG. 1, the label web material 16 is guided from the roll 14 through a feed nip defined between a driven feed roller 34 and a spring loaded pinch roller 36. The feed roller 34 is connected through a suitable gear drive to an electric motor 38 which, when energized, is operative to advance the label web material 16 from the roll 14. The label web material 16 is fed from the feed roller 34 downwardly through a suitable opening in the base plate 28 to form a loop 16*a* (FIG. 3) as the label web material is passed to a web material guide and advance assembly, indicated generally at 40. The web length between the roll 14 and web guide and advance assembly 40 is controlled by a set of photosensors, indicated schematically at 41*a* and 41*b* in FIG. 3, which sense the presence of the loop 16*a* and are connected in circuit with the feed motor 38 to advance the web and maintain a loop 16*a* so as to float approximately six to eight inches beneath the top plate 28. The web loop 16*a* forms a buffer loop so that the web hangs free at the point of entry into the web guide and advance assembly 40. As illustrated in FIG. 5, a fan 42 and air deflector plate 44 may be mounted beneath the base plate 28 to blow air onto the upwardly facing surface of the label material web loop 16*a* to assist in maintaining the loop path.

Figure 3:
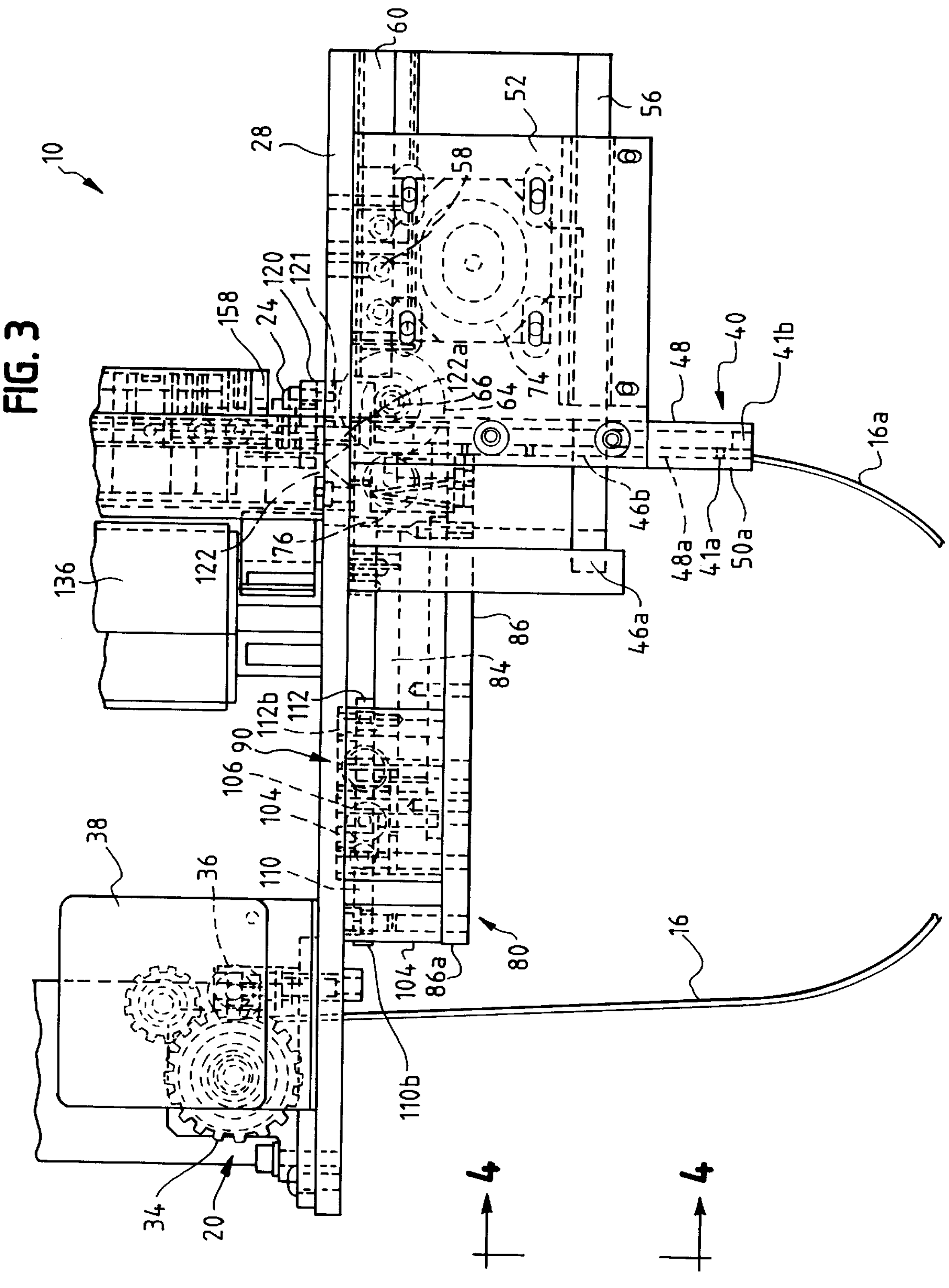
FIG. 3 is a fragmentary vertical sectional view taken substantially along line 3—3 of FIG. 2 with portions broken away for purposes of clarity.
Figure 4:
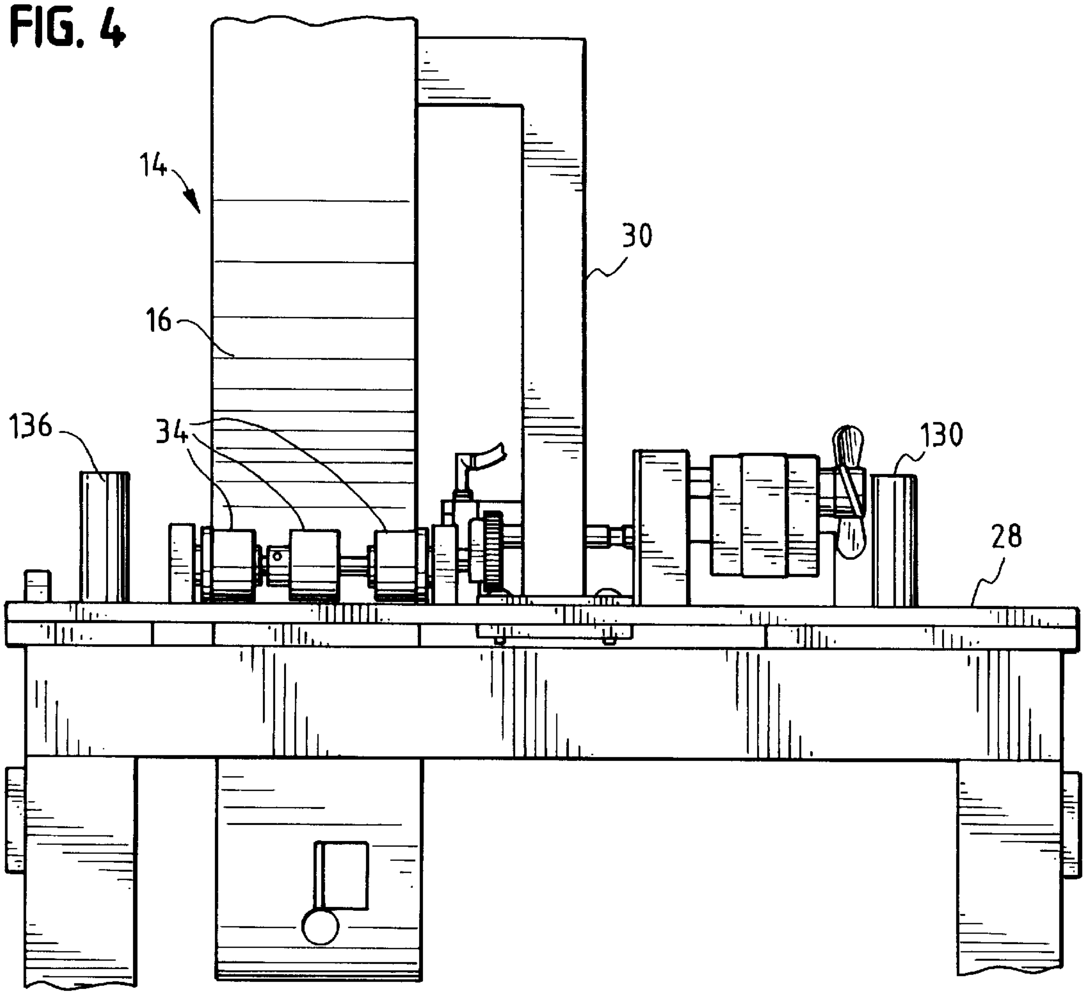
FIG. 4 is a fragmentary elevational view taken substantially along line 4—4 of FIG. 3 and looking in the direction of the arrows.

In addition to the loop photosensors 41*a* and 41*b* (FIG. 3), a sensing system is provided to detect depletion of label web material 16 from roll 14, and to provide a signal to a main conveyor drive control (not shown) to halt the introduction of new documents into the label applying station after a short delay, for purposes to be explained. Referring to FIG. 3, a pair of beam or photosensor elements indicated schematically at 46*a* and 46*b*, or other suitable sensors, are supported on opposite sides of the web material 16 where it passes through the base plate 28 so that the web material normally breaks the beam extending between the sensor elements as it advances longitudinally to the cutter station 22. As the roll 14 becomes depleted, the end of web 16 passes beyond sensor elements 46*a* and 46*b* (FIG. 3), creating a signal which is relayed to the conveyor system control to halt the further advance of mailing envelopes or other documents in the conveyor system 12. Because there is still a sufficient amount of label material in loop 16*a* to supply labels to documents already in the conveying system, the document conveyor system 12 is permitted to continue to advance a small number of additional documents, such as approximately 5–10 documents, after receiving a web depletion signal from sensors 46*a,b* before the conveyor system actually stops.

Figure 6:
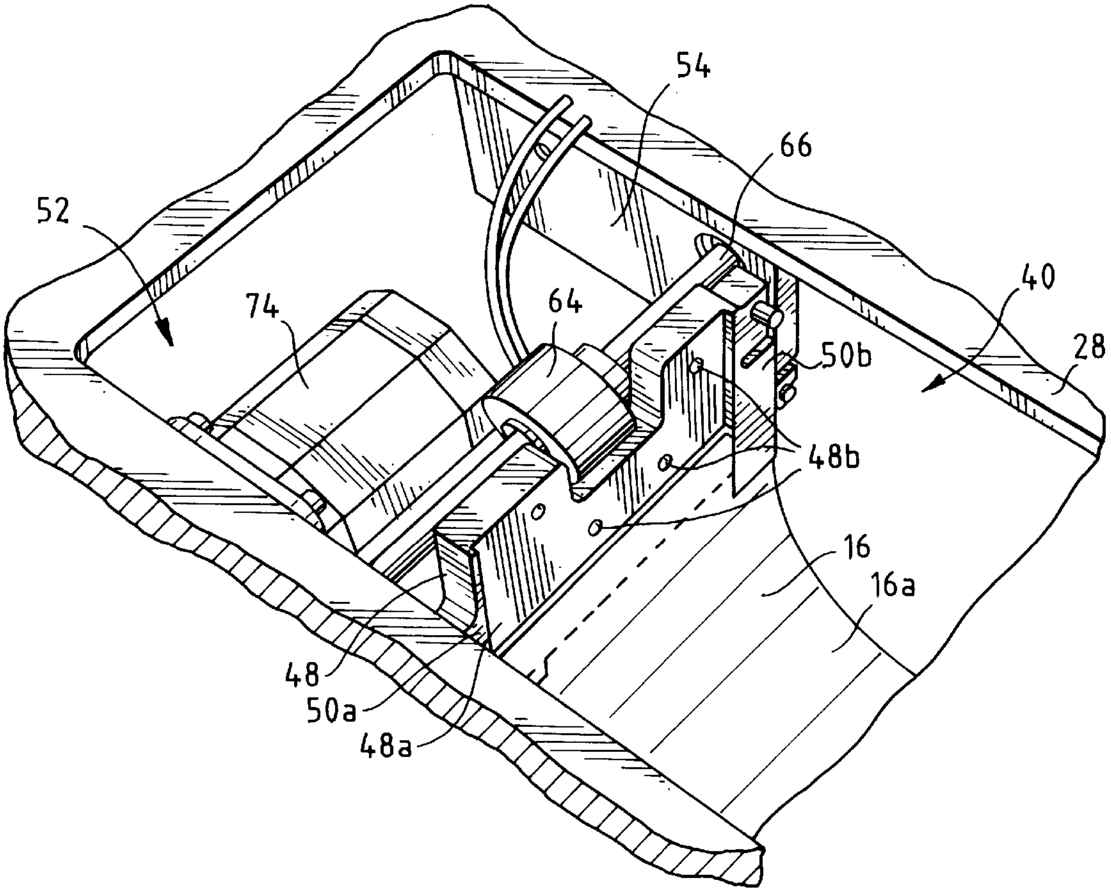
FIG. 6 is a fragmentary perspective view illustrating the label material web guide and advancing assembly for advancing the web to the cutter station.

Referring to FIGS. 5 and 6, taken in conjunction with FIG. 3, the label web material guide and advance assembly 40 includes a generally vertically disposed guide plate or manifold 48 having a generally vertical planar surface 48*a* (FIG. 6) bounded by a pair of laterally spaced parallel edge guides 50*a* and 50*b*. The edge guides 50*a* and 50*b* are spaced apart a distance generally equal to the lateral width of the label web material 16 and define an open channel to receive the lateral marginal edges of the web material so as to guide the web material along the planar surface 48*a* as the web material is advanced to the cutter station 22. A vacuum force is applied to the web material 16 through orifices 48*b* to hold the web material in contact with surface 48*a*, as will be explained hereinafter. A pair of laterally spaced side plates 52 and 54 are secured to the laterally opposite edges of the guide plate 48 so as to lie in parallel planes and extend rearwardly from the guide plate. The side plate 52 has its lower edge mounted on and slidable along a guide rod 56 (FIG. 5) which is suitably supported below the base plate 28 in parallel relation thereto. The side plate 54 has a cam follower or roller 58 mounted on its outer surface which is received within a rectilinear groove or channel formed in a guide plate 60 secured in normal relation to the underside of the base plate 28 so that the guide channel is parallel to the longitudinal axis of the guide rod 56. In this manner, the side plates 52 and 54 cooperate with the guide plate or manifold 48 to form a horizontally slidable carriage which may be moved along the guide rod 56 to a rearward position facilitating initial or replacement threading or guiding of the label web material 16 between the edge guides 50*a* and 50*b* and along the planar surface 48*a* of the guide plate 48.

To facilitate selective feeding or advancing of the label web material 16 upwardly along the guide plate surface 48*a*, a web advance or feed roll 64 is supported on a transverse drive shaft 66 so that feed roll 64 is positioned within a recess formed generally centrally in guide plate 48. The opposite ends of drive shaft 66 are journaled in the side plates 52 and 54 so that the outer peripheral surface of feed roll 64 extends slightly forwardly from the planar guide plate surface 48*a* and engages the non-adhesive surface of the label web material as it passes upwardly along the guide plate. As illustrated in FIGS. 5 and 6, the drive shaft 66 extends through the side plate 52 and has a timing belt pulley 68 fixed thereon which is connected through a timing belt 70 to a drive pulley 72 mounted on the output shaft of a stepping motor 74 supported on the inner surface of side plate 52. A ribbed pinch roller 76 (FIG. 3) is supported below the base plate 28 to cooperate with the feed roll 64 when in its forward position to advance the label web material in response to energizing the stepping motor 74. As will be described, the stepping motor 74 enables selective incremental advance of the label web material 16 to create labels of varying height, such as ⅝ inch height labels for bar coding and 1¼ inch height labels for address labels.

The guide plate or manifold surface 48*a* includes a plurality of vacuum orifices 48*b* which are connected to a source of vacuum through a control valve (not shown). A relatively low vacuum is applied to the orifices 48*b* so as to lightly retain the label web material in sliding contact with the guide plate surface 48*a* during cutting by the cutter blade 82 to create labels and subsequent feeding of additional web material 16 to cutter station 22. Note that the ribbed pinch roller 76 and the feed roller 64 act in conjunction with each other to advance the label material 16 vertically upward and along the manifold surface 48*a* while the vacuum is applied through the vacuum orifices 48*b*.

Figure 7:
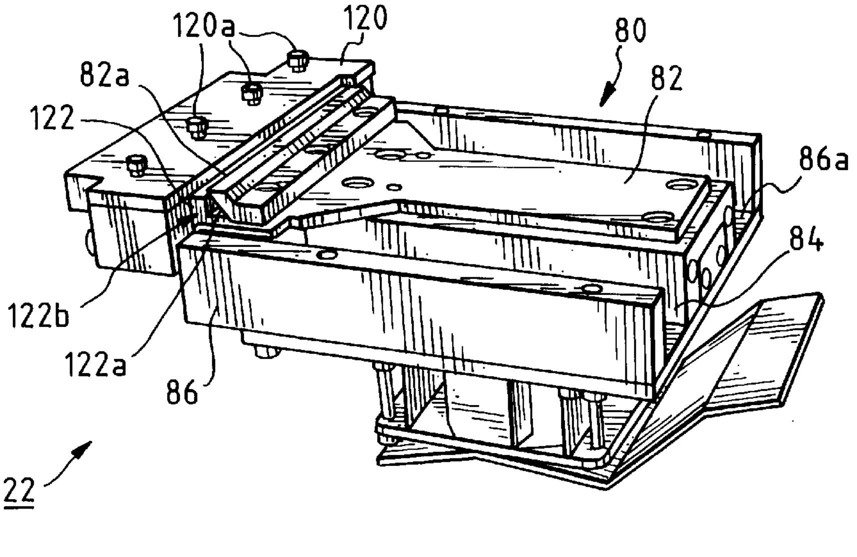
FIG. 7 is a perspective view of the cutter blade and stripper bar assembly removed from the base plate of the label applying system illustrated in FIG. 1.

The label web material 16 is advanced by the web guide and advance assembly 40 to a predetermined vertical position relative to the cutter station 22 which is operative to sever the label web material transversely of its longitudinal axis and create labels of any desired height. The cutter station 22 includes a cutter blade assembly, indicated generally at 80, which includes a cutter blade 82 having a forward cutting edge 82*a* (FIG. 7). The cutter blade 82 is secured to and carried by a precision ball slide 84 mounted on a horizontal plate 86*a* of a generally U-shaped support frame 86 secured to the underside of the base plate 28. The cutter blade 82 is adapted for horizontal rectilinear movement in a path normal to the guide plate surface 48*a* and lying in a vertical plane containing the longitudinal axis of the label web material 16.

Reciprocating movement of the cutter blade 82 is effected through a toggle link actuating mechanism indicated generally at 90. Referring to FIGS. 2 and 3, the toggle link actuating mechanism 90 is mounted below the base plate 28 and includes a pneumatic actuating cylinder 92 having a piston 92*a* which, in response to pneumatic pressure being applied to the actuating cylinder 92, acts through a coil compression spring 94 to move a slide block 96 in the axial direction of the piston 92*a*. The slide block 96 is biased in a direction toward the operating cylinder 92 by a coil compression spring 94 which is partially received within a blind bore in a support block 100 fixed to the underside of the base plate 28. The end of the coil compression spring 94 disposed within the support block 100 seats against a ball 102 which enables pivotal movement of the spring. The opposite end of compression spring 94 is received within a shallow recess or blind bore in the opposing end of the slide block 96 and biases the slide block toward the adjacent end of the operating cylinder 92 and against the compression spring 94. The opposite end of the operating cylinder 92 is pivotally interconnected through a ball 106 to a support block 104 fixed to the underside of base plate 28.

A pair of substantially identical actuating links 110 and 112 are pivotally connected to the slide block 96 at 110*a* and 112*a*, respectively. The opposite end of actuating link 110 is pivotally connected at 110*b* to a block 114 fixed to the underside of base plate 28. The opposite end of pivot link 112 is pivotally connected at 112*b* to the ball slide 84. With the slide block 96 positioned as illustrated in FIG. 2, pressurizing the actuating cylinder 92 will extend the piston 92*a* and effect movement of the slide block in a right-hand direction against the force of spring 98. This causes the actuating links 110 and 112 to undergo a toggle-like movement with link 110 pivoting about its fixed pivot connection 110*b* and link 112 moving the ball slide 84 and thereby cutter blade 82 in the longitudinal direction of the ball slide. The ball connections 102 and 106 accommodate slight lateral movement of the slide block 96 as the link 110 pivots about its pivot connection 110*b*. Release of pressure from the actuating cylinder 92 allows the coil spring 94 to return the slide block 98 to its home or initial position, which also returns the cutter blade to its original position. The geometry of the links 110 and 112 is selected to rapidly move the cutter blade through a cutting stroke of approximately ⅛ inch.

As illustrated in FIGS. 2, 3 and 7, the cutter blade 82 (FIGS. 2 and 7) is supported so that its cutting edge 82*a* (FIG. 7) is spaced a predetermined distance above the upper surface of the base plate 28 as determined by the spacing desired between the lower edge of a mailing envelope being conveyed by the conveyor belts 126 and 128 (FIG. 2) and the lower edge of a label applied to the envelope. The cutter blade 82 is also configured so that when it is in its rearward non-cutting position, as illustrated in FIG. 2, the cutting edge 82*a* is spaced slightly rearwardly from the plane of the planar surface 48*a* on the guide plate 48 and from the label web material 16 being fed upwardly along the guide surface by feed roll 64. During a cutting stroke, the cutting edge 82*a* cooperates with a stationary shearing blade 120 to sever the material web 16 transverse to its longitudinal axis (FIG. 7). The shearing blade 120 is generally rectangular and is supported on the upper surface of the base plate 28 through a spacer 121 (FIG. 3) and bolts 120*a* FIG. 2 so that a forward lower edge of the shearing blade cooperates with the cutting edge 82*a* to effect shearing of the label web material. The cutting edge 82*a* is formed on the cutter blade 82 to be sightly inclined to the plane of the material web 16, as considered in FIG. 2, so that the cutting edge effects a progressive cutting of the web material beginning with the right-hand edge as viewed in FIG. 2 and terminating with the left-hand edge as the cutter blade is fully extended in a cutting stroke.

It will be appreciated that as the cutter blade 82 is moved through a web severing stroke responsive to actuation of the actuating cylinder 92, the newly formed leading edge of the web material 16 will be moved slightly underneath the stationary shearing blade 120. To insure that the newly formed leading edge of the label web material 16 returns to a position enabling advance of the web material to create the next successive label without interference with the cutter blade 82, a stripper bar 122 FIGS. 3 and 7 is interconnected to the cutter blade so as to lie in generally parallel spaced relation forwardly from the cutting edge 82*a* to enable the label web material to pass between the cutting edge 82*a* and the stripper bar. To this end, the stripper bar 122 has a rearward edge surface 122*a* which is spaced closely adjacent the cutting edge 82*a* and extends slightly into the path of the label web material 16 when the cutter blade is in its retracted position. When the cutter blade 82 is actuated to sever the label web material, the stripper bar 122 moves with the cutter blade and slides under the stationary shearing blade 120.

Figure 9:
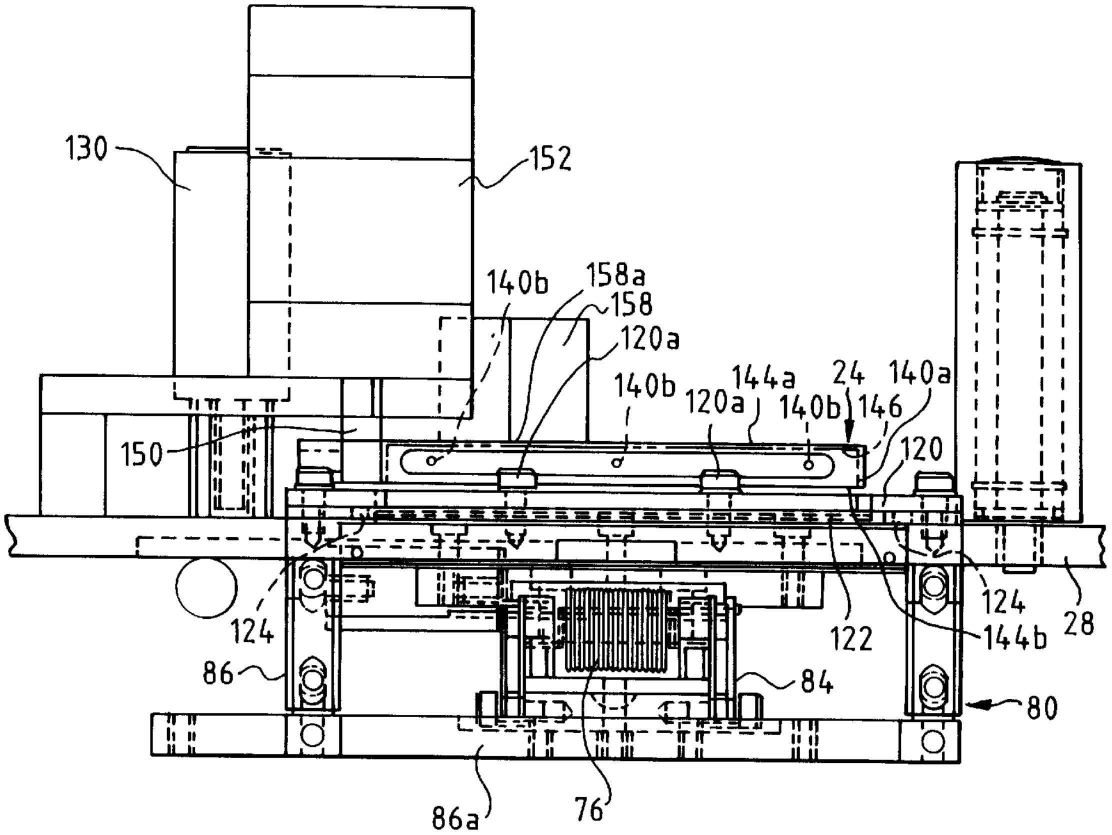
FIG. 9 is a fragmentary elevational view taken substantially along line 9—9 of FIG. 2.

When the cutter blade 82 has completed a label severing stroke, the stripper bar 122 follows its return path and pushes the newly formed leading edge of the web material back into the original label path, thereby enabling advancement of the web material for creating the next successive label. The stripper bar 122 is preferably generally U-shaped and secured to the cutter blade 82 by pins 124 (FIG. 9). Although not completely discernable as a U-shaped structure in FIG. 7, the stripper bar 122 extends forward of the cutting edge 82*a* and is generally parallel to the cutting edge along its width. The stripper blade may be made of a suitable plastic material, such as DELRIN, and has an elongated pocket 122*b* (FIG. 7) formed in its upper surface to receive a wicking material which holds a lubricant, such as a lubricating oil. The elongated pocket 122*b* (FIG. 7) is a groove or channel-like structure disposed in the upper surface of the stripper bar 122. The upper surface of the stripper bar 122, including the elongated pocket 122*b*, slides beneath the stationary shearing blade 120. As the stripper bar 122 moves forward and back with the cutting blade 82, the lubricant is deposited on and lubricates the surrounding components so as to prevent the accumulation of adhesive from the web material 16 as it is severed into labels.

As illustrated in FIG. 2, the conveyor belt system 12 includes a pair of endless conveyor belts 126 and 128 each of which is reeved about a plurality of idler rollers, such as indicated at 130 and 130*a*. The belts 126 and 128 define a run or reach of juxtaposed conveyor belts 126*a* and 128*a* and an entering nip 132 to receive mailing envelopes and the like from an upstream conveyor or other conveying means (not shown) and convey them in a downstream direction, or from left-to-right as considered in FIG. 2. It will be understood that a drive roller (not shown) is provided for each of the conveyor belts 126 and 128 so as to drive them at the same longitudinal speed. In the illustrated embodiment, a backup conveyor belt 134 is supported on a pair of idler rollers 136 so as to establish a reach of the conveyor belt 134 rearwardly of and engaging the conveyor belt reach 126*a* as it traverses a path past the cutter assembly 22. The idler rollers 130, 130*a*, and 136 are supported on the upper surface of the base plate 28 so that the corresponding conveyor belts 126, 128 and 134 are spaced above the base plate sufficiently to expose the lower surface areas of mailing documents being conveyed by the belt reaches 126*a,b* for applying labels to the exposed areas.

Figure 8:
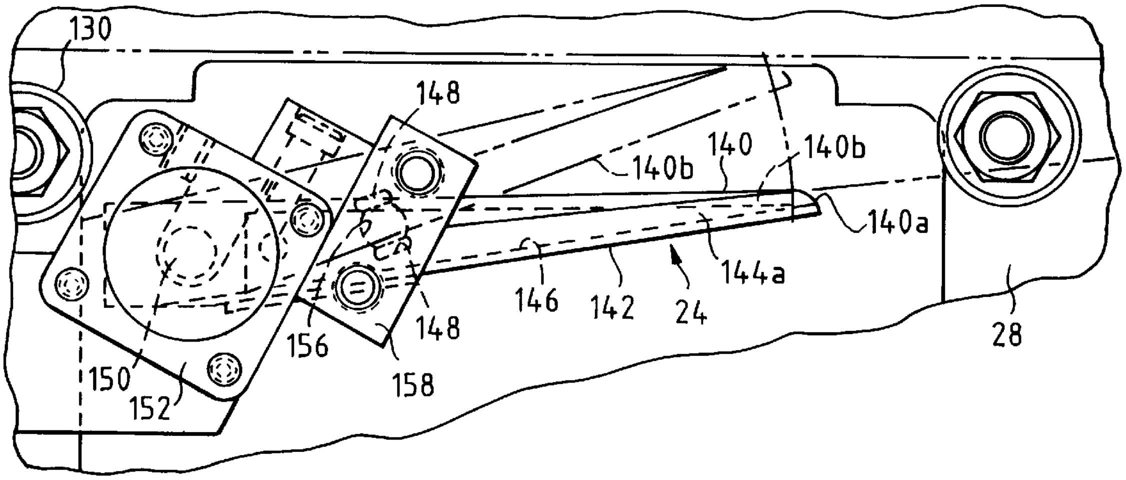
FIG. 8 is a fragmentary top plan view illustrating the label applying paddle member and associated actuator and vacuum supply.

As briefly aforedescribed, the paddle member 24 is operative in conjunction with severing of each successive label from the label web material 16 by the cutter assembly 22 so that the paddle member holds each label as it is being severed and moves the label to a position adhering it to a document being conveyed by the conveyor belt reaches 126*a* and 128*a*. Referring to FIGS. 8 and 9, taken in conjunction with FIG. 2, the paddle member 24 comprises an elongated hollow paddle member having a generally rectangular transverse cross-section defined by a planar forward label contact surface 140 which terminates in an outer curved end surface 140*a* a rearwardly planar wall surface 142, and upper and lower planar wall surfaces 144*a* and 144*b*, respectively. Paddle member 24 has a hollow internal vacuum chamber 146 adapted to be connected to a source of vacuum (not shown) through an oblong port 148 formed in the top wall 144*a*. The paddle member 24 is fixed on the lower end of a vertical pivot shaft 150 which forms the output shaft of a fluid pressure controlled actuator 152. The actuator 152 is mounted on the base plate 28 so that the paddle member 24 is spaced above the height of the cutting edge 82*a* for pivotal movement in a plane parallel to the base plate 28. The actuator 152 is of the type commercially available from MAC, Inc. under its model number 912B-PM-611BA, or equivalent.

The actuator 152 includes a four-way pneumatic control valve which enables time rotational oscillation of the pivot shaft 150 and thereby pivotal movement of paddle member 24 about the longitudinal axis of shaft 150. The actuator 152 is operative to pivot the paddle member between a position wherein the forward surface 140 is spaced slightly behind the plane of planar surface 48*a* of the web material guide plate, and a forward position wherein the curved outer end 140*a* of the paddle member contacts the lower exposed areas of mailing envelopes or the like being conveyed by the conveyor belt reaches 126*a* and 128*a* (FIG. 2).

The vacuum port 148 in the upper wall 144*a* of the paddle member 24 is adapted for registration with a vacuum orifice 156 formed in a bottom horizontal wall 158*a* (FIG. 9) of a vacuum block 158. The vacuum block 158 is supported in overlying relation to the paddle member 24 so that the upper wall 144*a* of the paddle member is in sliding contact with the opposed bottom horizontal wall 158*a* (FIG. 9) of the vacuum block. As illustrated in FIG. 8, the vacuum orifice 156 is configured so as to register with the vacuum port 148 in the paddle member 24 when the paddle member is in its rearward position behind the label web material 16 advanced by the label feed roller 34, and continues to remain in communication with port 148 until the paddle member reaches substantially its forward position, as shown in phantom in FIG. 8, at which time the vacuum port 148 no longer is in registration with the vacuum is orifice 156. With this arrangement, a vacuum created within the internal vacuum chamber 146 of the paddle member 24 and acts through a plurality of vacuum orifices 140*b* formed in the forward wall surface 140 of the paddle member to engage and hold the label as it is being severed from the label material web 16 by the cutter blade 82. Simultaneously with severing of a label from the web material, the paddle member is pivoted in a counter clockwise or forward direction about the pivot rod 150, as considered in FIG. 8, by actuation of the pneumatic actuator 152 so that the leading edge of the adhesive side of the label engages and is adhered to a document being conveyed in juxtaposed relation to the paddle member. When the paddle member 24 reaches its outermost pivotal position with the outer end 140*a* engaging a label against an envelope or the like, the vacuum port 148 is no longer in registration with the vacuum orifice 156 so that vacuum chamber 146 is no longer subjected to vacuum, thus releasing the force on the label. As the mailing envelope to which the label is being applied advances, it draws the label along the surface 140 of the paddle member to expose the leftmost orifice 140*b* in the paddle member to atmosphere. This allows the label to release from the paddle member and allows the curved paddle end 140*a* to progressively lightly adhere the remaining length of the label to the passing envelope. The paddle member 24 is then returned to its initial position by actuation of the actuator 152 preparatory to severing and applying the next successful label. The paddle member 24 is preferably positioned approximately one inch from the conveyor path traversed by mailing envelopes when the paddle member is in its rearward position.

The present invention includes several sensor systems to initiate and control the operation of the linerless label applicator 10. As seen in FIG. 2, straddling conveyor belt reaches 126*a* and 128*a* of the incoming document path are a plurality of sensor elements, indicated schematically at A, B, C, and D, each of which emits a signal to the electronic system operating label applicator 10 when an advancing document passes between the respective sensor elements. As a document is advanced along the document path formed by conveyor belt reaches 126*a* and 128*a* from left to right, as shown by arrow 159 in FIG. 2 sensor element A is initially actuated by the leading edge of an advancing document. Sensor A is one of a plurality of sensor elements disposed linerally along the document path of the overall document handling system (not shown) of which the label applicator 10 forms a part. These sensor elements A provide a tracking function to maintain control over the location of each document as it is advanced through the entire document handling system.

Sensor element B is an activate sensor which also emits an electronic signal when the leading edge of an advancing document is detected. As illustrated in the timeline diagram of FIG. 10, the signal produced by sensor element B initially performs two functions simultaneously. First, the stepping motor 74 operating stepping feed roll 64 is energized to advance web 16 twenty five steps upward (each step equals 0.023 inches in the preferred embodiment) between stationary shearing blade 120 and moveable cutter blade 82 to place the top of web 16 adjacent paddle element 24. For this purpose, the stepping motor 74 operates for approximately 12 milliseconds, which places the forward end of web 16 at the proper distance above cutter blades 82, 120 to form a label of the appropriate height. The timing of the operation of stepping motor 74 can be varied to adjust the height of the label to any predetermined amount. Second, the control system inhibits operation of paddle member 24 for approximately 28 milliseconds from the start of the sequence for the purpose of preventing the paddle from striking the web 16 after the web has been advanced twenty five steps and is located in the path of the paddle.

After the web 16 has been advanced for 12 milliseconds with the paddle initially inhibited, the air valve (not shown) operating movable cutter blade 82 is activated for approximately 25 milliseconds to cut the upstanding web material above the cutter blades 82, 120 from the remaining portion of the web to form the label.

Sensor elements C and D are similar in function to each other. However, sensor C is configured to emit an electronic signal when the leading edge of an advancing document is detected, and sensor element D is configured to emit an electronic signal when the trailing edge of an advancing document is detected. During operation, the operator selects which sensor C or D will be operative, since in certain document handling processes, the label must be placed dimensionally from the leading edge, and in other processes, the label is placed dimensionally from the trailing edge of the document.

Figure 10:
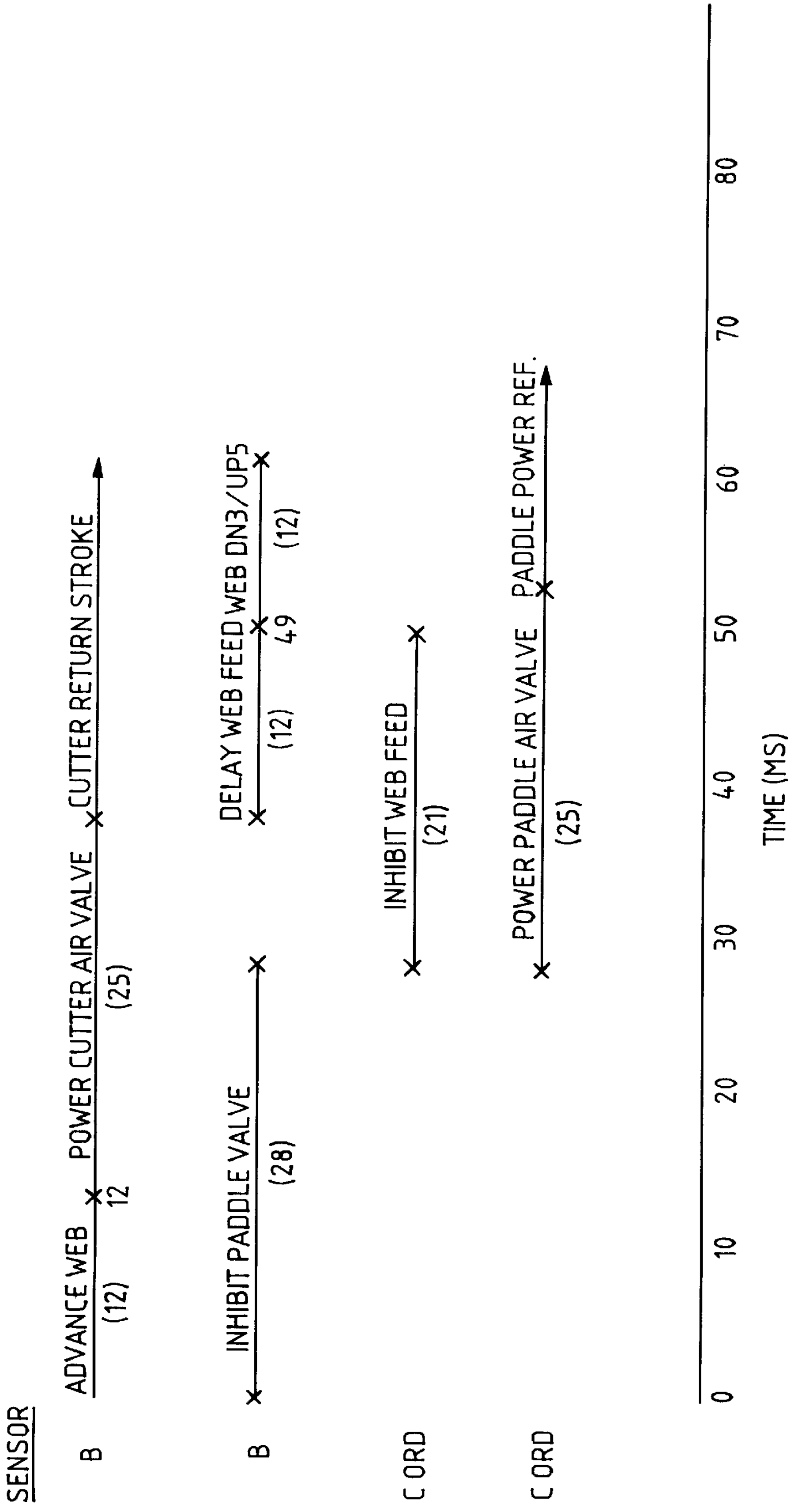
FIG. 10 is a logic diagram illustrating the sequence of operation of the various operating functions of the label applying system in accordance with the present invention.

When either sensor element C or D is triggered by the advancing document, a short delay in actuation of the paddle element 24 is programmed into the system to compensate for the distance between the sensor C or D and the label applying station, taking into account the speed of the advancing document. Then, as schematically shown in FIG. 10, the previous paddle inhibit function is then terminated. Next, the valve associated with the pneumatic actuator 152 for powering paddle element 24 is activated for approximately 25 milliseconds, causing paddle 24 to pivot outwardly whereby the label cut from web 16 is held by vacuum force to the paddle with the adhesive side of the web facing the document conveyor path. The label is then adhered to the advancing document as previously described. At the same time, sensor C or D initiates a signal which inhibits activation of the control for the web advance sequence for 21 milliseconds after detection of the advancing document by sensor C or D for the purpose of insuring that the remaining web material doesn't advance upward into the cutter station while the paddle 24 is moving back and forth.

The web feed and cutter activation control sequence under the influence of sensor element B causes the movable cutter blade 82 to return to its original or stand-by position under spring force after 25 milliseconds of operation. At the same time the movable cutter blade 82 begins movement to its return position, a delay signal is applied to the web advance motor 74 to delay further web movement until the movable cutter blade 82 clears the path along which the next length of web will advance. In this manner, the movable cutter blade will not interfere with the web material advance.

At the end of this 12 millisecond delay, the web advance inhibit function under the influence of sensor C or D is terminated, and the web material 16 is moved downward three steps and then immediately upward five steps over a period of 12 milliseconds. The purpose of this slight downward and then upward movement of the web at this juncture can be explained with reference to FIG. 11 which schematically illustrates the position of the movable cutting blade 82 immediately after a label 16*b* has been severed from the web material 16 and the label is being held by vacuum force to face 140 of paddle 24. As the movable cutter blade 82 moves in direction "a" following a cutting operation, the adhesive on face "b" of web 16 causes the uppermost tip of the uncut web to adhere to the underside of the movable cutting blade, as shown at "x" in FIG. 11. Allowing the web 16 to remain in this position would substantially inhibit subsequent upward advance of the web 16 by means of the stepping roller 64 and ribbed pinch roller 76, and prevent proper forming of subsequent labels.

Figure 11:
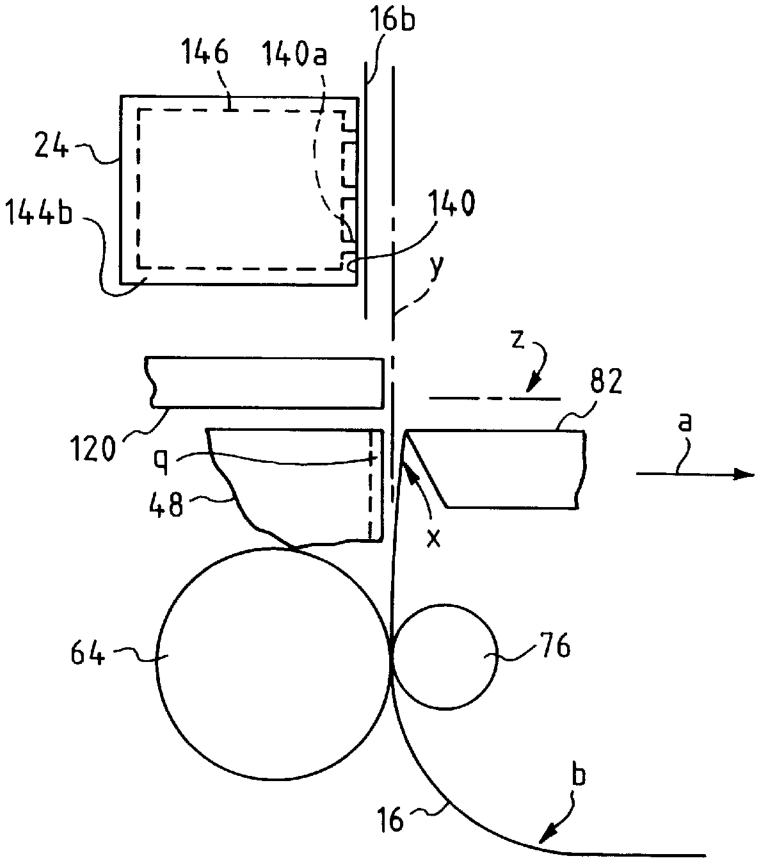
FIG. 11 is a schematic diagram of one aspect of the label material feed operation sequence.

To prevent this problem from occurring, the control system for the label applicator 10, under the influence of sensor B, following each cutting operation, drives stepping roller 64 three steps backward in a period of 12 milliseconds after the movable cutter blade 82 begins its movement back to its original position. During this 12 millisecond period, the movable cutter blade 82 moves out of the way of the web path indicated at "y", and cannot interfere with subsequent web advancement. As the stepping roller 64 moves the web down, the tip of the uncut web breaks free from the inclined underside of movable cutter blade 82, and is drawn leftward (as viewed in FIG. 11) by vacuum force towards and against manifold 48, as shown by reference letter "q" in FIG. 11. Once free from any adhesive grip with movable cutter blade 82, the web is now free to advance upward towards the cutter station and paddle without interference. Note that the above-described process and mechanism effectively frees the adhesive side of the label material 16 that may have inadvertently become "stuck" to the cutting edge 82*a* of the moveable blade 82. Also, as described above, the stripper bar 122 (FIG. 7) effectively frees the label material 16 from the underside of the stationary shearing blade 120 (FIG. 11).

Next, stepping roller 64 rapidly advances web 16 upward five steps to place the newly formed top or leading edge of the remaining label material 16 at a plane "z" vertically adjacent the approximate mid-height of fixed shearing blade 120, which is below the lower wall 144*b* of paddle member 24. At this time, paddle member 24 has returned to its original position by action of the paddle actuator 152. The paddle member 24 and movable cutter blade 82 are now in their starting positions, and the label web material 16 has been advanced above the cutting plane and into position ready for the next label advance and application cycle. This sequence is repeated to apply each successive label.

Figure 12:
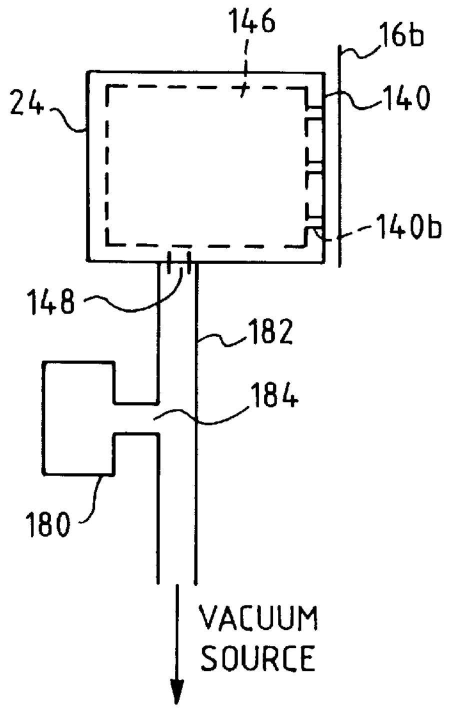
FIG. 12 is a schematic diagram of the paddle vacuum sensor apparatus.

Referring to FIG. 12, a vacuum sensor is illustrated schematically at 180 connected to a vacuum line 182 to the paddle member 24 through the vacuum block 158. Sensor 180 detects whether a label 16*b* cut from the label web material 16 is in proper position against the paddle forward surface 140 immediately following each label cutting operation, and also detects whether the label feed system is jammed or otherwise non-functional. The vacuum line or conduit 182 supplying vacuum to hollow chamber 146 of paddle 24 includes an orifice 184 to which the vacuum sensor 180 is operatively connected. The vacuum sensor 180 detects the vacuum level in conduit 182 and is programmed to emit a warning signal if the vacuum source falls below a pre-established threshold amount. In the illustrated embodiment, the vacuum source is supplied at approximately 15 inches Hg. Sensor 180 is programmed to emit a signal when the vacuum in conduit 182 falls to approximately 5 inches Hg.

When a label 16*b* is disposed against the forward face 140 of paddle 24, the surface of the label prevents leakage of vacuum from hollow vacuum chamber 146 through ports 140*b*, and the vacuum in the chamber 146 and conduit 182 is maintained at 15 inches Hg. If label 16*b* is not present on the forward face of paddle 24, vacuum pressure leaks from unobstructed ports 140*b*, and the vacuum source immediately drops to 5 inches Hg, causing sensor 180 to emit a signal which is conveyed to the document feed control system to halt the advance of documents towards the document labeling station. Upon correction of the error by an operator, the label application system 10 resumes its normal functions.

While a preferred embodiment of the present invention have been illustrated and described, it will be understood by those skilled in the art that changes and modification may be made therein without departing from the invention in its broader aspects. Various features of the inventions are defined in the following claims.

What is claimed is:

1. A linerless label application system for applying a source of continuous length linerless material to mail documents being conveyed in a substantially vertically oriented, non-overlapping sequential on-edge fashion along a first predetermined path along a substantially horizontally extending surface forming part of the system, the label material having an adhesive surface and an opposite non-adhesive surface adapted to have indicia printed thereon, the system comprising:

a conveyor transporting said ail documents along said first predetermined path along said surface in a substantially vertically oriented, non-overlapping sequential on-edge fashion;

a label feeder adapted for effecting progressive substantially vertical movement of the label material along a second predetermined path, a leading edge of the label material being in a predetermined juxtaposed relation to the first path;

a cutter station positioned in predetermined relation to the label feeder, the cutter station including cutting means operative to sever the label material generally transversely thereof a predetermined selectable distance from the leading edge so as to create a label of preselected height; and a paddle assembly including a substantially horizontally moveable paddle member supported adjacent the cutter station and adapted to engage the non-adhesive side of the label material between the leading edge of the label material and the cutting means, the substantially horizontally moveable paddle member operative to support and retain the severed label and press the adhesive surface of the label against a substantially vertical face of a document as the document travels in a continuous, substantially vertically oriented on-edge, non-overlapping, and non-interrupted manner along the first path through the label applying system.

2. The system as defined in claim 1 wherein said source of linerless label material is a roll having an axial opening therethrough, said label feeder further including a pair of freely rotatable rollers extending through said axial opening in a parallel spaced relation to a rotational axis of the roll, said roll being supported by said rollers so as to enable free rotation of said roll as the linerless label material is drawn therefrom.

3. The system as defined in claim 2 wherein said label feeder is operative to effect progressive movement of said linerless label material longitudinally from said roll through a looped path, said label feeder further including sensors operative to sense said looped path and advance the label material if the label material length through said looped path shortens so as to deviate from said looped path.

4. The system as defined in claim 1 wherein said paddle member is operative to apply a suction attachment to the label material to releasably retain the label material as the label material is severed by said cutting means.

5. The system as defined in claim 4 wherein said moveable paddle member is an elongated paddle pivotally supported adjacent one end for pivotal movement between a first position spaced from said first paths and a second position closely adjacent said first path, said paddle having a hollow interior portion and having a label engaging surface having at least one vacuum opening communicating with said hollow interior portion, said vacuum opening configured to apply a vacuum force to the label material, said paddle further having a valve orifice in communication with said hollow interior and adapted for connection to a source of vacuum so as to create a vacuum at said at least one vacuum opening, said valve orifice being operative to apply vacuum to said at least one vacuum opening when said paddle is in said second position and isolate said at least one vacuum opening from said source of vacuum when said paddle is in said first position.

6. The system as defined in claim 1 wherein said cutter station includes a guide plate having a guide surface disposed in a generally vertical plane, said guide surface lying in said second path so that said label material slides over guide surface as it approaches said cutting means.

7. The system as defined in claim 6 wherein said guide surface has at least one vacuum orifice connected to a source of vacuum, and including a control valve associated with said source of vacuum and operative to apply a vacuum to said at least one vacuum orifice to slidingly secure said label material to said guide surface as said cutting means severs the label material.

8. The system according to claim 1 where the cutting means includes a fixed blade and a movable blade, said movable blade disposed in a predetermined orientation relative to the fixed blade and operative to sever the label material transversely as the label material passes between the fixed blade and the movable blade.

9. The system as defined in claim 8 including control means operative to actuate said moveable blade and cut a transverse leading reference edge on said label material.

10. The system as defined in claim 8 wherein said cutter station includes a stripper bar supported in substantially parallel spaced relation to said moveable blade so as to define an opening therebetween through which said label material passes, said stripper bar being movable with said moveable blade and operative to return each newly formed transverse leading edge of the continuous length label material from a position beneath the fixed blade to a position preparatory to advancing the label material longitudinally and severing the next successive label from the label material.

11. The system as defined in claim 8 wherein said movable blade includes a cutting edge inclined to the plane of the label material disposed in said cutter station so as to progressively sever the label material transversely thereof in creating a label.

12. The system as defined in claim 11 wherein said moveable paddle member is movable between a position spaced from a document disposed proximal said cutter station and a position closely adjacent said document, said moveable blade being coordinated with said moveable paddle member so as to complete severing of said label material after movement of said moveable paddle member to initiate pressing of the label being severed against a document traversing the label applying station.

13. The system as defined in claim 8 including an actuating drive operatively associated with said cutter station so as to effect reciprocating movement of the moveable blade to sever a label from the label material in timed relation to longitudinal movement of the label material to said cutter station.

* * * * *